(12) United States Patent
Faibish et al.

(10) Patent No.: US 11,513,739 B2
(45) Date of Patent: Nov. 29, 2022

(54) FILE LAYER TO BLOCK LAYER COMMUNICATION FOR BLOCK ORGANIZATION IN STORAGE

(71) Applicant: EMC IP Holding Company LLC, Hopkinton, MA (US)

(72) Inventors: Sorin Faibish, Newton, MA (US); Ivan Bassov, Brookline, MA (US); Istvan Gonczi, Berkley, MA (US); Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 423 days.

(21) Appl. No.: 16/528,091

(22) Filed: Jul. 31, 2019

(65) Prior Publication Data
US 2021/0034248 A1 Feb. 4, 2021

(51) Int. Cl.
*G06F 3/06* (2006.01)
*G06F 16/174* (2019.01)
*G06F 16/16* (2019.01)

(52) U.S. Cl.
CPC ............ *G06F 3/067* (2013.01); *G06F 3/0608* (2013.01); *G06F 3/0641* (2013.01); *G06F 3/0643* (2013.01); *G06F 16/164* (2019.01); *G06F 16/1744* (2019.01); *G06F 16/1752* (2019.01)

(58) Field of Classification Search
CPC .. G06F 3/067; G06F 16/1752; G06F 16/1744; G06F 3/0608; G06F 3/0641; G06F 3/0643
USPC ................................................ 707/692, 682
See application file for complete search history.

(56) References Cited

U.S. PATENT DOCUMENTS

| | | | |
|---|---|---|---|
| 8,190,784 B1 | 5/2012 | Raizen et al. | |
| 8,751,828 B1 | 6/2014 | Raizen et al. | |
| 8,798,262 B1 | 8/2014 | Raizen et al. | |
| 8,826,041 B1 | 9/2014 | Contreras et al. | |
| 10,365,828 B1* | 7/2019 | Armangau | G06F 12/0871 |
| 10,452,616 B1 | 10/2019 | Bassov et al. | |
| 10,585,604 B2 | 3/2020 | Bassov | |
| 10,585,856 B1 | 3/2020 | Bigman | |
| 10,614,038 B1 | 4/2020 | Armangau et al. | |
| 2011/0125722 A1* | 5/2011 | Rao | G06F 16/174 707/693 |

(Continued)

OTHER PUBLICATIONS

Faibish, Sorin, et al.; "File Layer To Block Layer Communication for Selective Data Reduction;" U.S. Appl. No. 16/528,107, filed Jul. 31, 2019.

(Continued)

*Primary Examiner* — Syed H Hasan
*Assistant Examiner* — Nicholas E Allen
(74) *Attorney, Agent, or Firm* — BainwoodHuang (57) ABSTRACT

A method performed by a block-storage server, of storing data is described. The method includes (1) receiving, from a remote file server, data blocks to be written to persistent block storage managed by the block-storage server; (2) receiving, from the remote file server, metadata describing a placement of the data blocks in a filesystem managed by the remote file server; and (3) organizing the data blocks within the persistent block storage based, at least in part, on the received metadata. An apparatus, system, and computer program product for performing a similar method are also provided.

20 Claims, 7 Drawing Sheets

(56) References Cited

U.S. PATENT DOCUMENTS

| | | | | |
|---|---|---|---|---|
| 2017/0235591 A1* | 8/2017 | Kanada | | G06F 11/2035 |
| | | | | 714/6.23 |
| 2018/0129429 A1* | 5/2018 | Huang | | G06F 3/0659 |
| 2019/0065093 A1* | 2/2019 | Karr | | G06F 3/0649 |
| 2019/0146672 A1* | 5/2019 | Ben Dayan | | G06F 3/0604 |
| | | | | 711/154 |
| 2019/0171365 A1* | 6/2019 | Power | | G06F 3/067 |

OTHER PUBLICATIONS

P. Shilane, et al., "WAN optimized replication of backup datasets using stream-informed delta compression", Conference on File and Storage Technologies, 2012, 15 pages.
D. R. Bobbarjung, et al., "Improving duplicate elimination in storage systems", ACM Transactions on Storage, 2006, 2:424-448, 23 pages.
Broder, "On the resemblance and containment of documents", Proceedings of the Compression and Complexity of Sequences, 9 pages, 1997.
Broder, "Identifying and Filtering Near-Duplicate Documents", Proceedings of the 11th Annual Symposium on Combinatorial Pattern Matching, 2000, pp. 1-10, LNCS 1848, Springer-Verlag Berlin Heidelberg.
Broder, et al., "Min-Wise Independent Permutations", Journal of Computer and System Sciences, 2000, pp. 630-659, vol. 60.
P. Shilane, et al., "Delta Compressed and Deduplicated Storage Using Stream-Informed Locality", 4th USENIX Workshop on Hot Topics in Storage and File Systems, 2012, 5 pages.
M. C. Chan et al., "Cache-based Compaction: A New Technique for Optimizing Web Transfer", INFOCOM'99 conference, 1999, 9 pages, IEEE.
Y. Chen, et al., "Data redundancy and compression methods for a disk-based network backup system", Proceedings of the International Conference on Information Technology: Coding and Computing (ITCC'04), 2004, 8 pages, 1:778, IEEE.
"Zipline: Compression Without Compromise," Microsoft Corp, 2019.
J. J. Hunt, et al., "Delta algorithms: an empirical analysis", ACM Transactions on Software Engineering and Methodology, 1998, pp. 192-214, vol. 7, No. 2, ACM.
J. Macdonald, "File system support for delta compression", 2000, 32 pages, Master's thesis, Department of Electrical Engineering and Computer Science, University of California at Berkeley.
J. Manber, "Finding similar files in a large file system", Proceedings of the USENIX Winter Technical Conference, 1994, 12 pages.
Brownlee, "Datasets for Natural Language Processing", 2019, retrieved from <https://web.archive.org/web/20190501015656/https://machinelearningmastery.com/datasets-natural-language-processing> on Nov. 11, 2021, 6 pages.
J. C. Mogul, et al., "Potential benefits of delta encoding and data compression for HTTP", Proceedings of the ACM SIGCOMM '97 Conference, 1997, 60 pages.
C. Policroniades et al., "Alternatives for detecting redundancy in storage systems data", Proceedings of the USENIX Annual Technical Conference, 2004, retrieved from <https://www.usenix.org/legacy/publications/library/proceedings/usenix04/tech/general/full_papers/policroniades/policroniades_html/rabinPaper.html on Nov. 11, 2021, 22 pages.
S. Quinlan et al., "Venti: a new approach to archival storage", Proceedings of the 1st USENIX Conference on File and Storage Technologies, 2002, 13 pages.
M. O. Rabin, "Fingerprinting by random polynomials", Technical report, Center for Research in Computing Technology, 1981, 14 pages.
T. Suel et al., "Algorithms for delta compression and remote file synchronization", Lossless Compression Handbook, 2002, 24 pages.
D. Trendafilov, et al., "zdelta: An Efficient Delta Compression Tool", Department of Computer and Information Science at Polytechnic University, 2002, Technical Report TR-CIS-2002-02.
M. Naik, et al., "File System Extended Attributes in NFSv4", RFC 8276, 2017, 28 pages, IETF.
W. Xia, et al., "A Comprehensive Study of the Past, Present, and Future of Data Deduplication", Proceedings of the IEEE, 2016, pp. 1681-1710, vol. 104., No. 9.
B. Zhu, et al., "Avoiding the disk bottleneck in the Data Domain deduplication file system", Proceedings of the 6th USENIX Conference on File and Storage Technologies, 2008, pp. 269-282, USENIX Association.
"Theory of LSH: Distance Measures LS Families of Hash Functions S-Curves", 2009, retrieved from <http://infolab.stanford.edu/~ullman/mining/2009/similarity3.pdf> on Jan. 31, 2021.
F. Breitinger, et al., "Similarity Hashing Based on Levenshtein Distances", 10th IFIP International Conference on Digital Forensics (DF), Jan. 2014, pp. 133-147, Vienna, Austria.

\* cited by examiner

FILE LAYER TO BLOCK LAYER COMMUNICATION FOR BLOCK ORGANIZATION IN STORAGE

BACKGROUND

Data storage systems are arrangements of hardware and software in which storage processors are coupled to arrays of non-volatile storage devices, such as magnetic disk drives, electronic flash drives, and/or optical drives. The storage processors service storage requests arriving from host machines ("hosts"), which specify blocks, files, and/or other data elements to be written, read, created, deleted, etc. Software running on the storage processors manages incoming storage requests and performs various data processing tasks to organize and secure the data elements on the non-volatile storage devices.

Some storage systems separate filesystem management from block storage. Thus, a file server manages file-based requests, such as Network Attached Storage (NAS) requests. The file server then transmits block-based requests to a block storage server (e.g., across a Storage Area Network or SAN) to effect persistent storage on disk. The block storage server may expose logical disks to the file server.

SUMMARY

Conventional storage systems that separate file-based functionality from block-based functionality over a network may store data in a suboptimal manner. For example, data of some files may be written to block storage in random order, causing fragmentation. Given that read performance for file data is generally much better for sequentially-located data than for randomly-located data, the speed at which file data can be read may be limited by the random nature of writes.

Thus, it would be desirable to provide information about file organization in a file server to a block storage server so that the information can be taken into account when writing data to persistent storage. To this end, communication associated with writes of data blocks from the file server to the block storage server provides metadata that describes placement of the data blocks in a filesystem on the file server. The block storage server can then organize blocks belonging to the same files near one another in block storage, resulting in improved read performance.

In one embodiment, a method performed by a block-storage server, of storing data is described. The method includes (1) receiving, from a remote file server, data blocks to be written to persistent block storage managed by the block-storage server; (2) receiving, from the remote file server, metadata describing a placement of the data blocks in a filesystem managed by the remote file server; and (3) organizing the data blocks within the persistent block storage based, at least in part, on the received metadata. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments are directed to techniques for providing information about file organization in a file server to a block storage server so that the information can be taken into account when writing data to persistent storage. To this end, communication associated with writes of data blocks from the file server to the block storage server provides basic metadata that describes placement of the data blocks in a filesystem on the file server. The block storage server can then organize blocks belonging to the same files near one another in block storage, resulting in improved read performance.

Example Arrangement of System and Apparatuses

Figure 1:
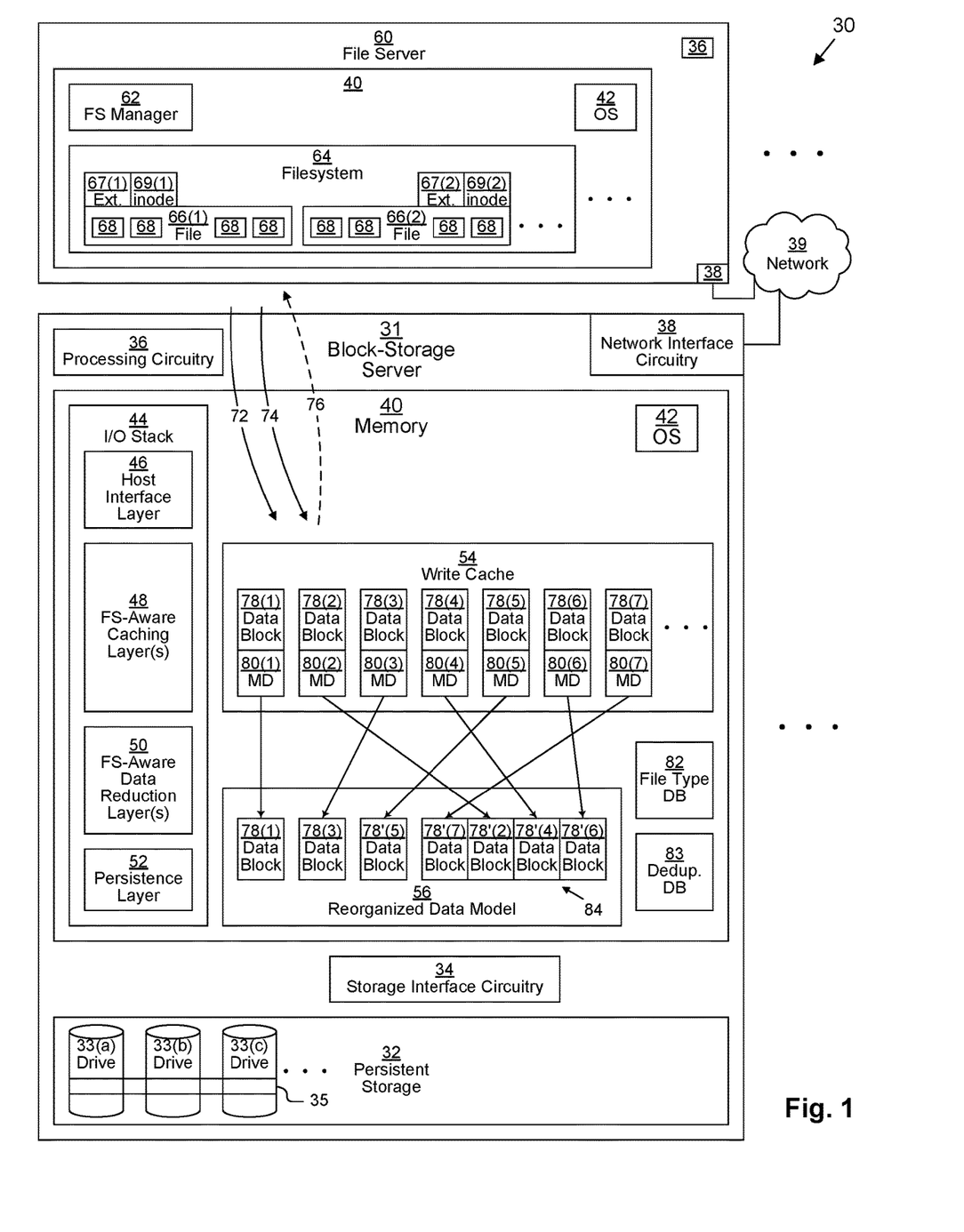
FIG. 1 is a block diagram depicting an example system and apparatuses for use in connection with various embodiments.

FIG. 1 depicts an example data storage environment (DSE) 30. DSE 30 includes one or more block-storage servers 31, one or more file servers 60, and network 39. DSE 30 is configured to persistently store data on behalf of host applications running on host devices (not shown). In some examples, the file servers 60 may themselves run host applications.

Block-storage server 31 may be any kind of computing device capable of storing block-based data, such as, for example, a data storage array, personal computer, workstation, server computer, enterprise server, laptop computer, tablet computer, smart phone, mobile computer, etc.

Block-storage server 31 includes persistent storage 32, storage interface circuitry 34, processing circuitry 36, network interface circuitry 38, and memory 40.

Persistent storage 32 may include any kind of persistent storage devices 33 (depicted as drives 33(a), 33(b), 33(c), . . . ), such as, for example, hard disk drives, solid-state storage devices (SSDs), flash drives, NVMe drives, etc. Storage interface circuitry 34 controls and provides access to persistent storage 32. Storage interface circuitry 34 may include, for example, SCSI, SAS, ATA, SATA, FC, M.2, U.2, and/or other similar controllers and ports. In some embodiments, the drives 33 are arranged in a Redundant Array of Independent Disks (RAID) configuration, such as, for example, RAID-5 or RAID-6. In these embodiments, stripes 35 are configured across drives 33 as is well-known in the art. In some embodiments, a Mapped RAID configuration may be used in which the drives 33 that make up each stripe 35 vary from stripe-to-stripe. In some configurations, an entire stripe 35 is typically written to persistent storage 32 at a time, and an entire stripe 35 is typically read and cached from persistent storage 32 at a time as well.

Processing circuitry 36 may include any kind of processor or set of processors configured to perform computerized operations, such as, for example, a microprocessor, a multi-core microprocessor, a digital signal processor, a system on a chip, a collection of electronic circuits, a similar kind of controller, or any combination of the above.

Network interface circuitry 38 may include one or more Ethernet cards, cellular modems, Fibre Channel (FC) adapters, Wireless Fidelity (Wi-Fi) wireless networking adapters, and/or other devices for connecting to a network 39. Network interface circuitry 38 allows the block-storage server 31 to communicate with one or more file servers 60 over network 39.

Network 39 may be any kind of computerized data communication network, such as, for example, a LAN, WAN, SAN, the Internet, a wireless communication network, a virtual network, a fabric of interconnected switches, etc.

In some embodiments, block-storage server 31 may include one or more processing nodes (not depicted) which connect to persistent storage 32 in a shared configuration. Thus, each processing node may include its own processing circuitry 36, network interface circuitry 38, and memory 40. In some embodiments, the processing nodes may connect to one another via their network interface circuitry 38. In some of these embodiments, each processing node also has its own storage interface circuitry 34 and locally-attached persistent storage 32 that it makes available to the other processing nodes over the network 39. In other embodiments, all of the processing nodes connect to the persistent storage 32 and storage interface circuitry 34 over a storage bus or network.

In some embodiments, each processing node may be configured as a circuit board assembly or blade which plug into a chassis that encloses and cools the processing nodes and persistent storage 32. The chassis may have a backplane for interconnecting the processing nodes and persistent storage 32, and additional connections may be made among processing nodes using cables.

Memory 40 may include any kind of digital system memory, such as, for example, random access memory (RAM). In the non-limiting example shown, memory 40 stores an operating system (OS) 42 in operation (e.g., a Linux, UNIX, Windows, MacOS, or similar operating system). Memory 40 may also store an input/output (I/O) stack 44 in operation and a write cache portion 54. In some embodiments, memory 40 also stores a reorganized data model 56, a file type database (DB) 82, and/or a digest DB 83.

I/O stack 44 executes on processing circuitry 36 to fulfill block-based data storage requests received from file servers 60. I/O stack 44 may include various layered drivers, including, for example, a top-level host interface layer 46 at (or near) the top of the I/O stack 44, one or more filesystem-aware (FS-Aware) caching layers 48, one or more FS-aware deduplication layers 50, and a persistence layer 52. I/O stack 44 may also contain additional drivers (not depicted).

Memory 40 may be configured as a collection of memory pages, each of which has a standard page size, as is known in the art. For example, the page size may be 4 KB, 8 KB etc. In some example embodiments, the page size is equal to the block size.

Memory 40 may also store various other data structures used by the OS 42, I/O stack 44, and various other applications (not depicted).

In some embodiments, memory 40 may also include a persistent storage portion (not depicted). Persistent storage portion of memory 40 may be made up of one or more persistent storage devices, such as, for example, magnetic disks, flash drives, solid-state storage drives, or other types of storage drives. Persistent storage portion of memory 40 or persistent storage 32 is configured to store programs and data even while all or part of the block-storage server 31 is powered off. The OS 42, applications, I/O stack 44, and DBs 82, 83 are typically stored in this persistent storage portion of memory 40 or on persistent storage 32 so that they may be loaded into a system portion of memory 40 upon a system restart or as needed. The I/O stack 44, host interface layer 46, FS-Aware caching layer(s) 48, FS-Aware deduplication layer(s) 50, and persistence layer 52, when stored in non-transitory form either in the volatile portion of memory 40 or on persistent storage 32 or in persistent portion of memory 40, each form a computer program product. The processing circuitry 36 running one or more applications thus forms a specialized circuit constructed and arranged to carry out the various processes described herein.

File server 60 may also be any kind of computing device, such as, for example, a personal computer, workstation, server computer, enterprise server, data storage array, laptop computer, tablet computer, smart phone, mobile computer, etc. File server 60 also includes processing circuitry 36, network interface circuitry 38, and memory 40.

Processing circuitry 36 of file server 60 may include any kind of processor or set of processors configured to perform computerized operations, as described above.

Network interface circuitry 38 of file server 60 may include one or more Ethernet cards, cellular modems, Fibre Channel (FC) adapters, wireless networking adapters (e.g., Wi-Fi), and/or other devices for connecting to a network 39. Network 39 may be any kind of computerized data communication network, such as, for example, a LAN, WAN, SAN, the Internet, a wireless communication network, a virtual network, a fabric of interconnected switches, etc. Network interface circuitry 38 allows the file server 60 to communicate with one or more block-storage servers 31 and one or more host devices over network 39. In some embodiments, separate networks 39 may be used to communicate with block-storage servers 31 (e.g., this network 39 may be a SAN) and with host devices (e.g., this network 39 may be a LAN).

Memory 40 of file server 60 has similar physical characteristics as memory 40 of block-storage server 31, described above. Memory 40 of file server 60 stores an OS 42 in operation, filesystem manager 62 in operation, and various other applications in operation. Memory 40 of file server 60 may also store various other data structures used by the OS 42, filesystem manager 62, and various other applications.

Filesystem manager 62 executes on processing circuitry 36 of file server 60 to fulfill file-based data storage requests received from host applications with respect to one or more filesystems 64 managed by the filesystem manager 62. Although filesystems 64 are managed by filesystem manager 62 and are logically depicted within memory 40 of file server 60, the blocks 68 of files 66 of the filesystems 64 are actually stored as data blocks 78 managed by block-storage server 31 and ultimately-backed by persistent storage 32. Each file 66 (depicted as files 66(1), 66(2), . . . ) of a filesystem 64 includes a set of blocks 68 of data as well as an Mode 69. Files 66 may also have associated file extensions 67 (e.g., ".txt" for a text file, ".doc" or ".docx" for a Microsoft Word document, etc.). The Mode 69 may also include various additional metadata about the file 66, such as, for example, its size, creation and modification times, pointers to the blocks 68 of the file 66 within a logical address space of the filesystem 64 (such pointers may be in the Mode 69 or within one or more indirect blocks pointed to by the Mode, as is well-known in the art), and various other extended file attributes (e.g., a file type, such as JPEG/Exif 2.0).

In some embodiments, memory 40 of file server 60 may also include a persistent storage portion (not depicted). Persistent storage portion of memory 40 may be made up of one or more persistent storage devices, such as, for example, magnetic disks, flash drives, solid-state storage drives, or other types of storage drives. Persistent storage portion of memory 40 is configured to store programs and data even while all or part of the file server 60 is powered off. The OS 42, applications, and filesystem manager 62 are typically stored in this persistent storage portion of memory 40 so that they may be loaded into a system portion of memory 40 upon a system restart or as needed. The OS 42, applications, and filesystem manager 62, when stored in non-transitory form either in the volatile portion of memory 40 or in persistent portion of memory 40, each form a computer program product. The processing circuitry 36 of file server 60 running one or more applications thus forms a specialized circuit constructed and arranged to carry out the various processes described herein.

In example operation, as host applications write to files 66 managed by filesystem manager 62, filesystem manager 62 processes these writes by sending block-based write commands to block-storage server 31. A block-based write command includes both data 72 (e.g., contents of blocks 68) and filesystem-level metadata 74. Host interface layer 46 receives these block-based write commands from file servers 60, and, once they have been processed by the I/O stack 44, host interface layer 46 may respond back to the issuing file server 60, acknowledging completion.

Upon receiving a write command, host interface layer 46 extracts data blocks 78 from the write command data 72, and FS-Aware caching layer(s) 48 stores those data blocks 78 in write cache 54 in conjunction with filesystem-level metadata 80 extracted from filesystem-level metadata 74. As depicted, write cache 54 includes data blocks 78(1), 78(2), 78(3), 78(4), 78(5), 78(6), 78(7), each stored in conjunction with respective filesystem-level metadata 80(1), 80(2), 80(3), 80(4), 80(5), 80(6), 80(7).

In some embodiments, the FS-Aware caching layer(s) 48 uses the filesystem-level metadata 80 to logically-rearrange the data blocks 78 within a reorganized data model 56 that reflects how the data will be written to persistent storage 32. Thus, as depicted, data blocks 78(7), 78(2), 78(4), and 78(6) all belong to the same file 66, but they are written in disparate physical locations within write cache 54 due to being received by the write cache 54 at different times. However, FS-Aware caching layer(s) 48 logically rearranges the data blocks 78(7), 78(2), 78(4), and 78(6) to be adjacent within the reorganized data model 56. In addition, as depicted, data blocks 78(7), 78(2), 78(4), 78(6) may be compressed together as compressed data blocks 78'(7), 78'(2), 78'(4), 78'(6) within reorganized data model 56.

In some embodiments, the FS-Aware data reduction layer(s) 50 uses the filesystem-level metadata 80 to decide whether to apply data reduction techniques such as data compression and/or deduplication and/or what level of data reduction to apply to any given block 78 before it is stored in persistent storage 32. Thus, as depicted, FS-Aware data reduction layer(s) 50 applies data compression to data block 78(5) to yield compressed data block 78'(5) within the reorganized data model 56. The compressed data block 78'(5) is ultimately written to persistent storage 32 based on filesystem-level metadata 80(5) indicating that data compression should be applied, but FS-Aware data reduction layer(s) 50 has not applied data compression to data blocks 78(1), 78(3) based on filesystem-level metadata 80(1), 80(3) indicating that data compression should be not be applied to those data blocks 78(1), 78(3) prior to being written to persistent storage 32 by persistence layer 52.

In some embodiments, I/O stack 44 sends feedback 76 from the block-storage server 31 back to the file server 60 with respect to information that is useful to the filesystem manager 60 in managing filesystems 64.

Operation with respect to block reorganization; selective data reduction; and feedback will now be described in further detail.

Example Block Organization Based on Filesystem Metadata

Figure 2:
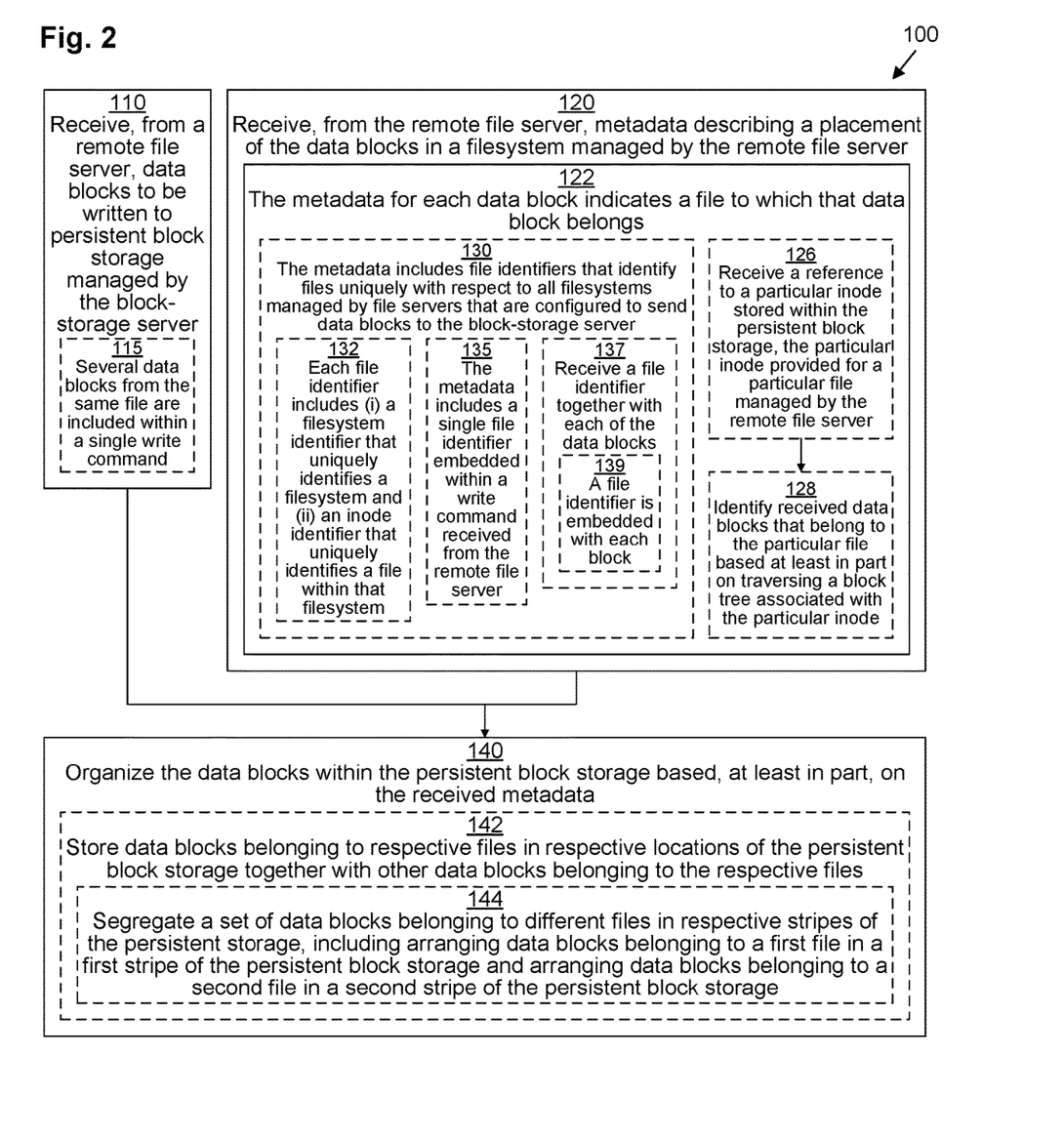
FIG. 2 is a flowchart depicting example methods according to various embodiments.

FIG. 2 illustrates an example method 100 performed by block-storage server 31 for storing blocks 78 within persistent storage 32 according to an organization scheme influenced by filesystem-level metadata 74 received from a remote file server 60 in accordance with various embodiments. It should be understood that any time a piece of software (e.g, OS 42, I/O stack 44, host interface layer 46, FS-Aware caching layer(s) 48, FS-Aware deduplication layer(s) 50, persistence layer 52, or filesystem manager 62) is described as performing a method, process, step, or function, what is meant is that a computing device (e.g., block-storage server 31, file server 60, or one of their component processing nodes) on which that piece of software is running performs the method, process, step, or function when executing that piece of software on its processing circuitry 36. It should be understood that one or more of the steps or sub-steps of method 100 may be omitted in some embodiments. For example, sub-steps 115, 126, 128, 130, 132, 135, 137, 139, 142, and 144 are depicted with dashed lines, indicating that they are either optional or representative of alternative embodiments. Similarly, in some embodiments, one or more steps or sub-steps may be combined together or performed in a different order.

In step 110, I/O stack 44 receives, from a remote file server 60, data 72 to be written to persistent block storage 32 managed by the block-storage server 31. For example, in some embodiments, as depicted in sub-step 115, data 72 from several data blocks 68 of the same file 64 are received together as part of a single write command (e.g., a SCSI command). FS-Aware caching layer(s) 48 places this data 72 into write cache as one or more data blocks 78.

In step 120, which may be performed concurrently with step 110, I/O stack 44 receives, from the remote file server 60, metadata 74 (stored as metadata 80 within write cache 54) describing a placement of the data blocks 68 (stored as data blocks 78 within write cache 54) of the data 72 in a filesystem 64 managed by the remote file server 60.

In sub-step 122, the metadata 80 for each data block 78 indicates a file 64 to which that data block 78 belongs. In some embodiments, sub-step 122 is implemented by sub-sub-step 130, while in other embodiments it is implemented by sub-sub-steps 126-128.

In sub-sub-step 130, the metadata 74 includes file identifiers that identify files 66 uniquely with respect to all filesystems 64 managed by file servers 60 that are configured to send data 72 to the block-storage server 31. Thus, the file identifiers may be globally-unique or they may satisfy a less strict uniqueness requirement whereby they are unique within the context of all filesystems 64 managed by all file servers 60 that communicate with block-storage server 31. Thus, for example, in sub-sub-sub-step 132, each file identifier includes (i) a filesystem identifier (FSID) that uniquely identifies a filesystem 64 (e.g., uniquely within the context of DSE 30) and (ii) an inode identifier (e.g., an inode number) that uniquely identifies a file 66 within that filesystem 64 by reference to its inode 69.

In some embodiments, in sub-sub-sub-step 135, the metadata 74 includes a single file identifier embedded within a write command received from the remote file server 60 (see sub-step 115). Thus, several blocks 68 within data 72 may be represented by the same file identifier as their metadata 74.

In other embodiments, in sub-sub-sub-step 137, I/O stack 44 receives a separate file identifier together with each of the data blocks 68 within data 72. In some embodiments, in sub-sub-sub-sub-step 139, the file identifier is embedded with each block 68. For example, some systems use 520-byte sectors instead of standard 512-byte sectors. Since a block 68, 78 is typically made up of eight or sixteen 512-byte sectors (i.e., 4 KB or 8 KB) a system that uses eight 520-byte sectors has 4,160 bytes per block rather than 4,096 bytes, leaving sixty-four bytes available for embedded information to be transmitted therewith.

In sub-sub-step 126, I/O stack 44 receives a reference to a particular inode 69 stored within the persistent block storage 32, the particular inode 69 provided for a particular file 66($x$) managed by the remote file server 60. Since inodes 69 are part of the filesystems 64, they are also ultimately backed by persistent storage 32. For example, inodes 69 may have a fixed size (e.g., 256 or 512 bytes), and persistent storage 32 may store a fixed number (e.g., 8, 16, or 32) of inodes 69 within a block. Thus, a particular inode 69($x$) may be referenced by pointing to a logical address within a filesystem 64 and an offset within that block where the inode 69($x$) is physically stored.

Then, in sub-sub-step 128, I/O stack 44 is able to identify received data blocks 78 that belong to the particular file 66($x$) based at least in part on traversing a block tree associated with the particular inode 69($x$) identified (e.g., an indirect block tree pointed to within that inode 69($x$)).

After steps 110 and 120, once the data blocks 78 and filesystem-level metadata 80 are stored within write cache 54, in step 140, the FS-aware caching layer(s) 48 organizes the data blocks 78 within the persistent block storage 32 based, at least in part, on the received metadata 74 (represented by filesystem-level metadata 80). Thus, FS-aware caching layer(s) 48 logically places the data blocks 78 within reorganized data model 56 for persistence layer 52 to physically write to persistent storage 32.

In some embodiments, step 140 includes sub-step 142. In sub-step 142, I/O stack 44 stores data blocks 78 belonging to respective files 66 in respective locations of the persistent block storage 32 together with other data blocks 78 belonging to the respective files 66. Sub-step 142 may include simply aggregating as many blocks 78 belonging to the same file 66 as possible (with or without compression), up to some limit (e.g., up to thirty-two or sixty-four 4-KB blocks 78 may be aggregated together in some embodiments). In some embodiments, sub-step 142 includes sub-step 144. In sub-step 144, FS-aware caching layer(s) 48 segregates a set of data blocks 78 belonging to different files 66 in respective stripes 33 of the persistent storage 32, including arranging data blocks 78 belonging to a first file 66 (e.g., file 66(1)) in a first stripe 35 (e.g., stripe 35(A), not shown)) of the persistent block storage 32 and arranging data blocks 78 belonging to a second file 66 (e.g., file 66(2)) in a second stripe 35 (e.g., stripe 35(B), not shown) of the persistent block storage 32. This may be visualized by referring to FIG. 3.

Figure 3:
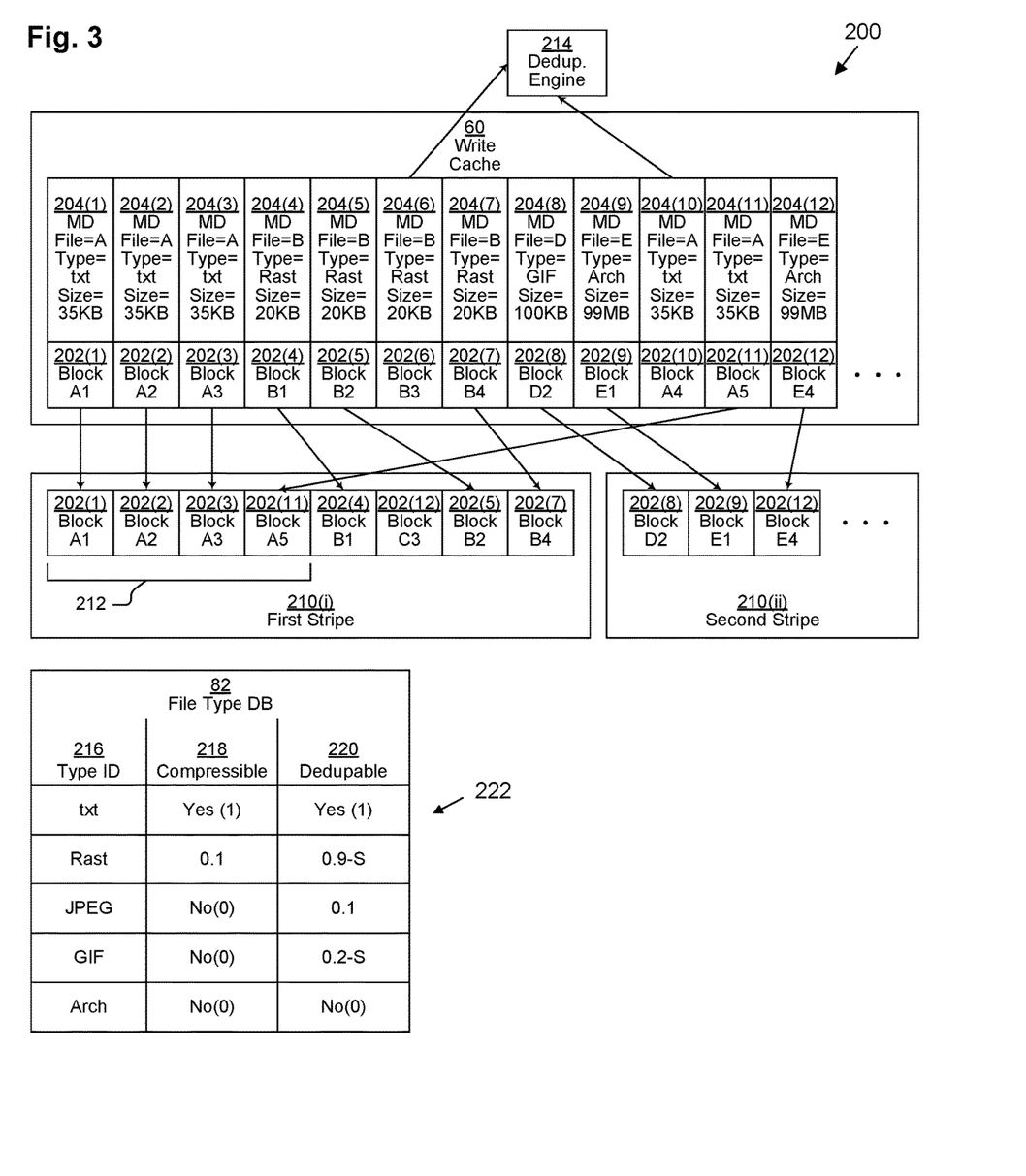
FIG. 3 is a block diagram depicting an example arrangement of data structures for use in connection with various embodiments.

Referring to arrangement 200 of FIG. 3, blocks 202(1), 202(2), 202(3), and 202(11) all belong to file "A," and they are all placed within first stripe 210($i$), while blocks 202(9), 202(12) both belong to file "E," and they are both placed within second stripe 210($ii$). It can be seen that each stripe 210 might not exclusively contain blocks 78 belonging to a single file 66 (e.g., first stripe 210($i$) contains blocks 78 belonging to files A, B, and C), but typically, the not-yet-persisted blocks 78 in write cache 54 from any given file 66 will all be placed in a single stripe 210, to the extent possible.

Figure 4:
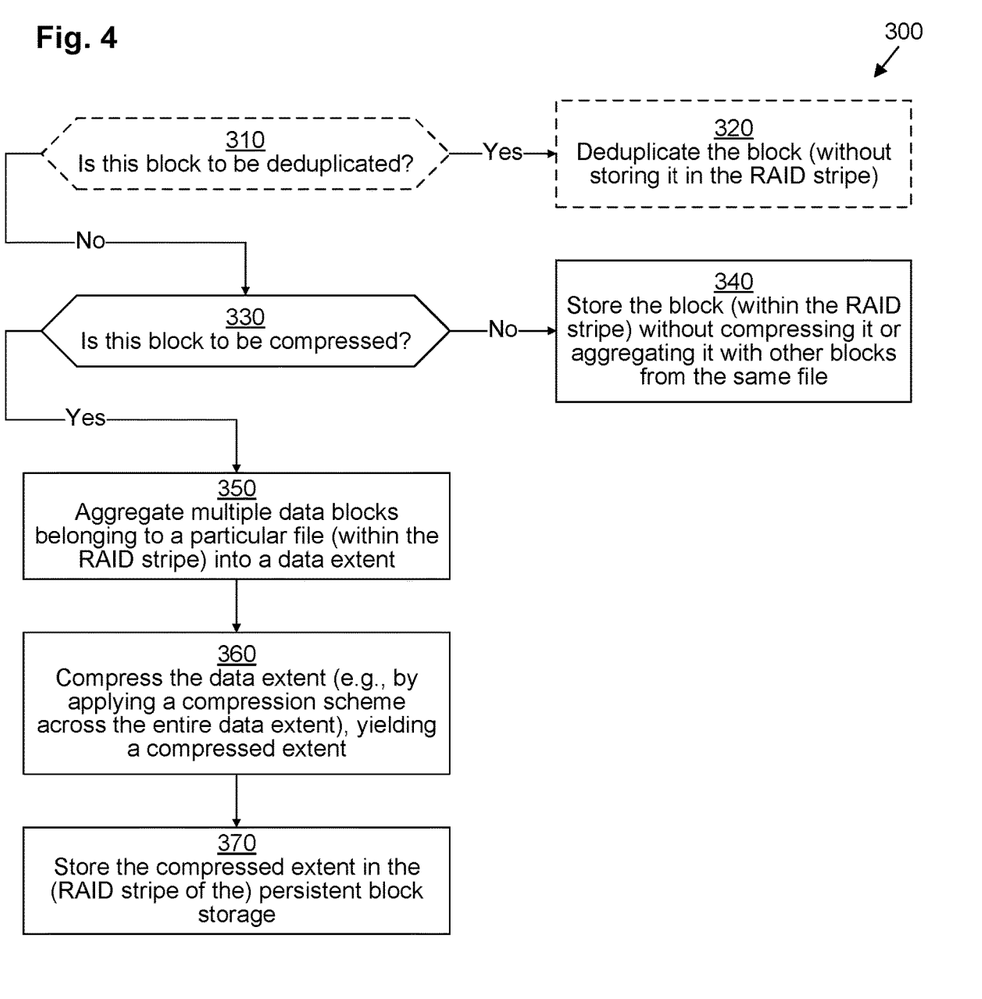
FIG. 4 is a flowchart depicting example methods according to various embodiments.

FIG. 3 also depicts an arrangement 200 made in accordance with method 300 of FIG. 4. FIG. 4 illustrates an example method 300 performed by I/O stack 44 for implementing step 140 of method 100. It should be understood that one or more of the steps or sub-steps of method 300 may be omitted in some embodiments. For example, steps 310-320 are depicted with dashed lines, indicating that it is optional, depending on the embodiment. Similarly, in some embodiments, one or more steps may be combined together or performed in a different order.

Method 300 is a method for processing any given block 78($x$) from write cache 54 for compliance with step 140.

In some embodiments, in step 310, FS-aware data reduction layer(s) 50 determines whether or not the block 78($x$) should be deduplicated. In some embodiments, this step may simply include applying known deduplication techniques (e.g., using deduplication DB 83) to decide if the block 78($x$) can be deduplicated. In other embodiments, step 310 may also include deciding whether to even apply deduplication to the block 78($x$) to begin with (see below in connection with FIG. 5). If the block 78($x$) is to be deduplicated, then operation proceeds with step 320, in which the block 78($x$) is deduplicated; otherwise operation continues with step 330. Since deduplication obviates the need to store a block 78 again, writing block 78($x$) to a stripe 35 of persistent storage 32 is skipped. Thus, looking at example arrangement 200 of FIG. 3, it can be seen that blocks 204(6) and 204(10) are both deduplicated by a deduplication engine 214 (which may be part of FS-Aware data reduction layer(s) 50), so those blocks 204(6), 204(10) are not placed into either stripe 210($i$), 210($ii$).

In step 330, FS-aware data reduction layer(s) 50 determines whether or not the block 78($x$) should be compressed. In some embodiments, this step may simply include applying known data compression techniques to decide if the block 78($x$) can be compressed into an effectively smaller size. In other embodiments, step 330 may also include deciding whether to even apply compression to the block 78($x$) to begin with (see below in connection with FIG. 5). If the block 78($x$) is not to be compressed, then operation proceeds with step 340, in which the block 78($x$) is stored on persistent storage 32 without any compression or (further) aggregation. Thus, in embodiments in which segregation on a stripe level is performed (e.g., embodiments in which sub-sub-step 144 is included within method 100), after being assigned to a stripe 35, the block 78($x$) is simply written to the next available space within its assigned stripe 35. Thus, referring to the example arrangement 200 of FIG. 3, block 202(4) is not compressed, so it is written directly to first stripe 210($i$).

If a block 78 is to be compressed (i.e., step 330 yields an affirmative result), then operation proceeds with step 350. In step 350, FS-Aware caching layer(s) 48 aggregates multiple data blocks 78 belonging to a particular file 66 into a single data extent, and, in step 360, FS-Aware data reduction layer(s) 50 compresses the data extent to yield a compressed aggregated extent 212. For example, in order to obtain a data reduction benefit due to compressing a large region all together, the compression may be done by applying a compression algorithm to the data extent as a whole. Thus, referring to the example arrangement 200 of FIG. 3, blocks 202(1), 202(2), 202(3), and 202(11) all belong to file A and all are subject to being compressed, so they are aggregated together and compressed into a compressed aggregated extent 212.

Finally, in step 370, the compressed aggregated extent 212 is stored to the persistent storage 32. Thus, referring to the example arrangement 200 of FIG. 3, compressed aggregated extent 212 is written to first stripe 210(i).

Example File-Level-Aware Selective Data Reduction

Figure 5:
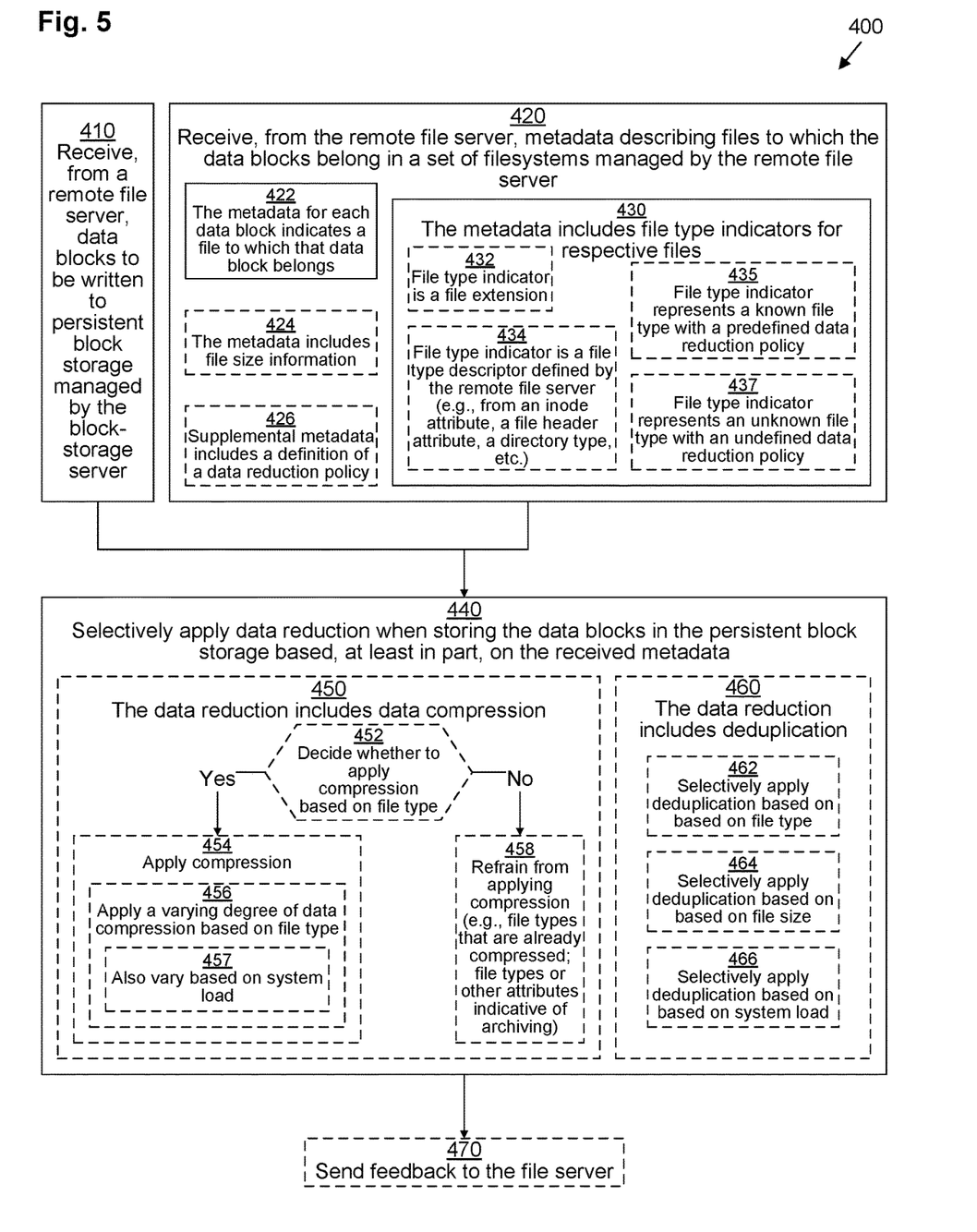
FIG. 5 is a flowchart depicting example methods according to various embodiments.

FIG. 5 illustrates an example method 400 performed by block-storage server 31 for storing data blocks 78 within persistent storage 32 with data reduction selectively applied influenced by filesystem-level metadata 74 received from a remote file server 60 in accordance with various embodiments. It should be understood that one or more of the steps or sub-steps of method 400 may be omitted in some embodiments. For example, step 470 and sub-steps 424, 426, 432-437, and 450-466 are depicted with dashed lines, indicating that they are either optional or representative of alternative embodiments. Similarly, in some embodiments, one or more steps may be combined together or performed in a different order.

In step 410, I/O stack 44 receives, from a remote file server 60, data 72 to be written to persistent block storage 32 managed by the block-storage server 31. Step 410 is similar to step 110 of method 100.

In step 420, which may be performed concurrently with step 410, I/O stack 44 receives, from the remote file server 60, metadata 74 (stored as metadata 80 within write cache 54) describing files 66 to which the data blocks 68 (stored as data blocks 78 within write cache 54) of the data 72 belong in a set of filesystems 64 managed by the remote file server 60.

In sub-step 422, the metadata 80 for each data block 78 indicates a file 64 to which that data block 78 belongs. Step 422 is similar to step 122 of method 100.

In some embodiment, in sub-step 424, the metadata 80 for each data block 78 includes file size information that indicates how big the file 64 to which that data block 78 belongs is.

In sub-step 430, the metadata 80 includes file type indicators for respective files 66. A file type indicator may be a file extension 67(y) for a particular file 66(y) (sub-sub-step 432).

A file type indicator may be a file type descriptor defined by the remote file server 60 (sub-sub-step 434). Thus, for example, the remote file server 60 may have extracted an extended attribute (e.g., file type JPEG/Exif 2.0) from the Mode 69(y) of a particular file 66(y), remote file server 60 may have extracted header information from the first block 68 of a particular file 66(y), or remote file server 60 may have extracted an extended attribute from the Mode 69 of a parent directory of a particular file 66(y).

In some embodiments, the file type indicator represents a known file type with a predefined data reduction policy (sub-sub-step 435). Thus, referring back to the example arrangement 200 of FIG. 3, it can be seen that file type DB 82 includes a set of entries 222 that provide definitions of data reduction policies for given file type identifiers (IDs) 216. Thus, in some embodiments, each entry 222 defines a compressibility policy 218 and a dedupability policy 220. Thus, as depicted, a text file (with a file type ID 216 of "txt") is deemed to be compressible (i.e., all blocks 78 belonging to such files 66 should be compressed, if possible) and dedupable, meaning "able to be deduplicated" (i.e., all blocks 78 belonging to such files 66 should be examined for deduplication, e.g., by hashing it and referencing deduplication DB 83).

In some embodiments, instead of compressibility policy 218 having a binary value of Yes or No, it may have a numeric value ranging from zero (not subject to being compressed at all) to 1. A value of 1 may either indicate that a maximum amount of compression should be applied or that compression should always be attempted regardless of system load.

In some embodiments, instead of dedupability policy 220 having a binary value of Yes or No, it may have a numeric value ranging from zero (not subject to being deduplicated at all) to 1. A value of 1 may either indicate that deduplication should always be attempted regardless of system load or that deduplication should always be attempted regardless of a file size extracted from filesystem-level metadata 80.

As further depicted, a raster image file (with a file type ID 216 of "Rast") is deemed to be somewhat compressible, having a compressibility policy 218 of 0.1, and mostly dedupable, having a dedupability policy 220 of 0.9-S(the "-S" indicating that file size should be considered). Thus, deduplication will be attempted on small raster image files (e.g., smaller than 64 KB), but not on large raster image files (e.g., 64 KB or larger).

As further depicted, a JPEG image file (with a file type ID 216 of "JPEG") is deemed to be not compressible, and slightly dedupable, having a dedupability policy 220 of 0.1 (indicating that deduplication should only be attempted if system load is below 10%). As further depicted, a GIF image file (with a file type ID 216 of "GIF") is deemed to be not compressible, and slightly dedupable, having a dedupability policy 220 of 0.2-S (the "-S" indicating that file size should be considered). As further depicted, an archival file (with a file type ID 216 of "Arch") is deemed to be neither compressible nor dedupable, since these files are typically subjected to extreme data reduction methods overnight or on weekends, so there is no point in wasting resources by applying any data reduction now.

In some embodiments, the file type indicator represents an unknown file type with an undefined data reduction policy (sub-sub-step 437). These are file types whose file type IDs 216 either do not (yet) appear in file type DB 82 at all, or whose entries are incomplete (e.g., either the compressibility policy 218 or the dedupability policy 220 is undefined). How this type of situation may be dealt with will be explained below in connection with FIGS. 6 and 7.

After steps 410 and 420, once the data blocks 78 and filesystem-level metadata 80 are stored within write cache 54, in step 440, the FS-aware data reduction layer(s) 50 selectively applies data reduction when storing the data blocks 78 in the persistent block storage 32 based, at least in part, on the received metadata 74.

In some embodiments, in sub-step 450, selectively applying data reduction includes selectively applying data compression. In sub-sub-step 452, the FS-aware data reduction layer(s) 50 decides whether or not to apply data compression to a block 78 based on the file type of the file 66 to which it belongs. Thus, for example, reference may be made to the file type DB 82, and if the compressibility policy 218 is defined to be No, then, in sub-sub-step 458, the FS-aware data reduction layer(s) 50 refrains from applying data compression. For example, this may be done for file types that are already compressed (e.g., compressed image and video files such as GIF, JPEG, and MPEG) and for file types indicative of archival. If the compressibility policy 218 is defined to be non-zero, then, in sub-sub-step 454, compression may be selectively applied. In some embodiments (e.g., where the compressibility policy 218 is binary), compression is always attempted in sub-sub-step 454. In other embodiments, as in sub-sub-sub-step 456, a varying degree of data compression may be applied depending, at least in part, on the value of the compressibility policy 218). In sub-sub-sub-sub-step 457, the degree of applied data compression may also depend on system load. Thus, for example, as depicted in FIG. 3, when the system load exceeds 10%, compression of raster image files may be omitted. In an alternative embodiment, the compressibility policy 218 of 0.1 indicates that only a very low level of compression (e.g., LZ1) is applied to raster image files.

In some embodiments, in sub-step 460, selectively applying data reduction includes selectively applying deduplication. In sub-sub-step 462, the FS-aware data reduction layer(s) 50 decides whether or not to apply deduplication to a block 78 based on the file type of the file 66 to which it belongs. Thus, for example, reference may be made to the file type DB 82, and if the dedupability policy 220 is defined to be No, then the FS-aware data reduction layer(s) 50 refrains from applying deduplication.

In sub-sub-step 464, the FS-aware data reduction layer(s) 50 decides whether or not to apply deduplication to a block 78 based on the file size of the file 66 to which it belongs. Thus, for example, deduplication may be omitted for blocks belonging to files whose size exceeds a threshold size (e.g., 64 KB).

In sub-sub-step 466, the FS-aware data reduction layer(s) 50 decides whether or not to apply deduplication to a block 78 based on the current system load. Thus, for example, deduplication may be omitted whenever the system load exceeds a threshold value (e.g., 85%).

In some embodiments, two or more of sub-sub-steps 462, 464, and 466 are combined. Thus, in some embodiments, file size is only considered if the dedupability policy 220 so indicates (e.g., with an indication of "-S"). So, as depicted in FIG. 3, raster image files are only subjected to inline deduplication if they are smaller than 64 KB and the system load is less than 90%, but text files are always subjected to inline deduplication (if possible to deduplicate), and JPEG files are only subjected to inline deduplication if the system load is less than 10% regardless of their size.

Figure 7:
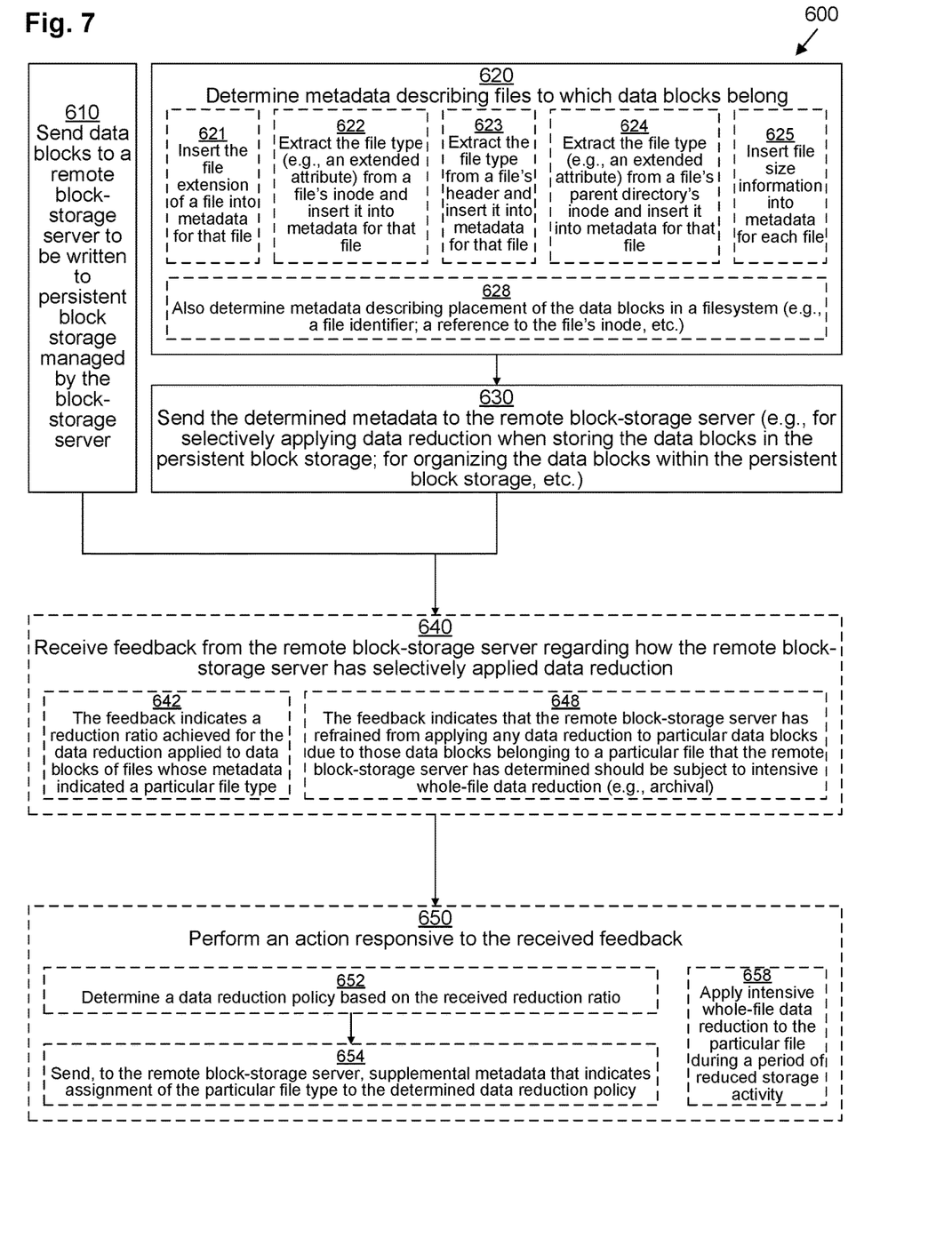
FIG. 7 is a flowchart depicting example methods according to various embodiments.

FIG. 7 illustrates an example method 600 performed by file server 60 for causing data blocks 68 to be stored within persistent storage 32 with data reduction selectively applied influenced by filesystem-level metadata in accordance with various embodiments. Thus, FIG. 7 may be performed by file server 60 in conjunction with method 400 being performed by block-storage server 31. It should be understood that one or more of the steps or sub-steps of method 700 may be omitted in some embodiments. For example, steps 640 and 650 and sub-steps 621-628, 642, 648, and 652-658 are depicted with dashed lines, indicating that they are either optional or representative of alternative embodiments. Similarly, in some embodiments, one or more steps may be combined together or performed in a different order.

In step 610, filesystem manager 62 sends data blocks 68 to a remote block-storage server 31 to be written to persistent block storage 32 managed by the block-storage server 31.

Steps 620 and 630 may be performed concurrently with step 610. In step 620, filesystem manager 62 determines metadata 74 describing files 66 to which the data blocks 68 being sent in step 610 belong. In some embodiments, step 620 may include inserting the file extension 67 for a file 66 whose blocks 68 are being written into metadata 74 (sub-step 621).

In some embodiments, step 620 may include extracting the file type (e.g., an extended attribute) from the inode 69 for a file 66 whose blocks 68 are being written, and inserting the extracted file type into metadata 74 (sub-step 622).

In some embodiments, step 620 may include extracting the file type from a header found in the first block 68 of a file 66 whose blocks 68 are being written, and inserting the extracted file type into metadata 74 (sub-step 623).

In some embodiments, step 620 may include extracting the file type (e.g., an extended attribute) from the inode 69 for the parent directory of a file 66 whose blocks 68 are being written, and inserting the extracted file type into metadata 74 (sub-step 624).

In some embodiments, step 620 may include extracting the file size from the inode 69 for a file 66 whose blocks 68 are being written, and inserting the extracted file size into metadata 74 (sub-step 625).

In some embodiments, step 620 may include, as sub-step 628, inserting an indication for each data block 68 of the file 66 to which that data block 68 belongs (see step 122).

In step 630, filesystem manager 62 sends the metadata 74 determined in step 620 to the remote block-storage server 31 (e.g., for selectively applying data reduction when storing the data blocks 68 in the persistent block storage 32 as part of method 400; for organizing the data blocks 68 within the persistent block storage 32 as part of method 100, etc.).

Example Feedback to the File Server

In some embodiments, in step 640, file server 60 receives feedback 76 from the remote block-storage server 31 regarding how the remote block-storage server 31 has selectively applied data reduction.

In some embodiments, step 640 includes sub-step 642. In sub-step 642, the feedback 76 indicates a reduction ratio achieved for the data reduction applied to data blocks 78 belonging to files 66 whose metadata 74 indicated a particular file type that was unknown (see sub-sub-step 437 in FIG. 5). The feedback 76 may include both a compression ratio and a deduplication ratio.

In some embodiments, step 640 includes sub-step 648. In sub-step 648, the feedback 76 indicates that the remote block-storage server 31 has refrained from applying any data reduction to particular data blocks 78 due to those data blocks 78 belonging to a particular file 66 that the remote block-storage server 31 has determined should be subject to intensive whole-file data reduction techniques (e.g., archival).

Then, in step 650, file server 60 performs an action responsive to the received feedback 76. In embodiments in which sub-step 642 is part of step 640, step 650 includes sub-steps 652-654. In embodiments in which sub-step 648 is part of step 640, step 650 includes sub-step 658.

In sub-step 652, file server 60 determines a data reduction policy (e.g., a compressibility policy 218 and/or a dedupability policy 220) based on the received reduction ratio(s). Then, in sub-step 654, file server 60 sends, to the remote block-storage server 31, supplemental metadata 74 that indicates assignment of the particular file type to the determined data reduction policy. This supplemental metadata 74 may be received by the remote block-storage server 31 in sub-step 426 of method 400 (see FIG. 5). See below in connection with FIG. 6 for more detail.

In sub-step 658, during a period of reduced storage activity file server 60 applies intensive whole-file data reduction to the particular file 66 that was previously indicated in sub-step 648.

Figure 6:
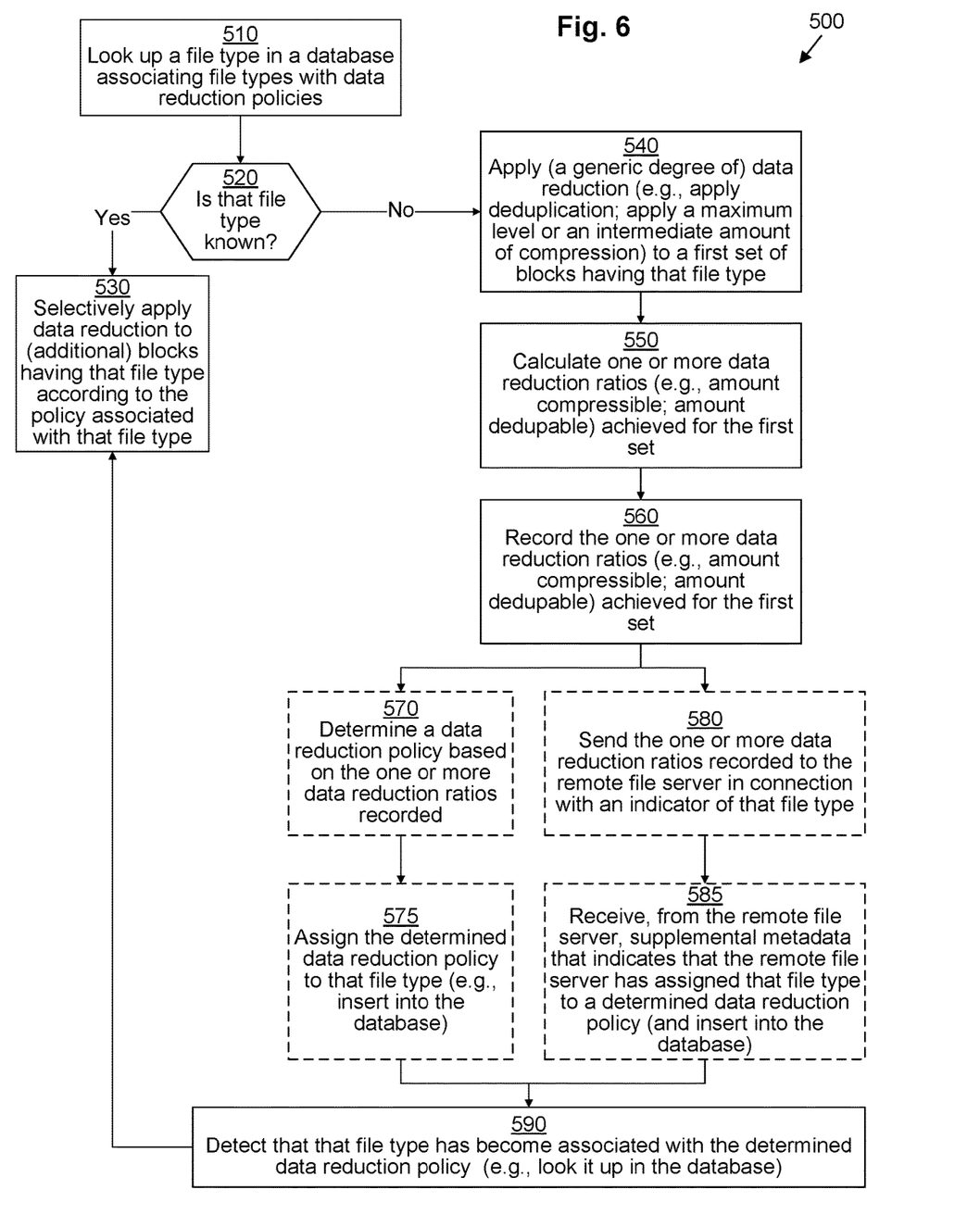
FIG. 6 is a flowchart depicting example methods according to various embodiments.

FIG. 6 illustrates an example method 500 performed FS-Aware data reduction layer(s) 50 for implementing step 440 of method 400. It should be understood that one or more of the steps of method 500 may be omitted in some embodiments. For example, steps 570-575 and 580-585 are depicted with dashed lines, indicating that they are indicative of alternative embodiments. Similarly, in some embodiments, one or more steps may be combined together or performed in a different order.

Method 500 is a method for selectively applying data reduction to blocks 78 belonging to files of a particular file type and dealing with unknown types.

In step 510, FS-Aware data reduction layer(s) 50 looks up a particular file type in file type DB 82 that associates file types with data reduction policies. In step 520, FS-Aware data reduction layer(s) 50 determines whether or not the particular file type is known (e.g., whether it has an entry 222 in file type DB 82 that is fully-defined). If the particular file type is known, then, in step 530, FS-Aware data reduction layer(s) 50 selectively applies data reduction to blocks 78 having the particular file type according to the policy associated with that file type in file type DB 82. If the particular file type is not known, then operation proceeds with step 540.

In step 540, FS-Aware data reduction layer(s) 50 applies (a generic degree of) data reduction (e.g., apply deduplication; apply a maximum level or an intermediate amount of compression) to a first set of blocks 78 having the particular file type. Then, in step 550, FS-Aware data reduction layer(s) 50 calculates one or more data reduction ratios (e.g., an amount compressible; and/or an amount dedupable) achieved for the first set of blocks 78 having the particular file type. Then, in step 560, FS-Aware data reduction layer(s) 50 records the calculated one or more data reduction ratios achieved for the first set of blocks 78 having the particular file type.

Then, in some embodiments, operation proceeds with steps 570-575, while in other embodiments operation proceeds with steps 580-585.

In step 570, FS-Aware data reduction layer(s) 50 locally determines a data reduction policy (e.g., a compressibility policy 218 and/or a dedupability policy 220) based on the one or more data reduction ratios that were recorded in step 560. In step 575, FS-Aware data reduction layer(s) 50 assigns the determined data reduction policy to that file type (e.g., inserts the compressibility policy 218 and/or dedupability policy 220 into the file type DB 82).

In step 580, FS-Aware data reduction layer(s) 50 sends the one or more data reduction ratios that were recorded in step 560 to the remote file server 60 in connection with an indicator of that file type. The file server 60 receives this as feedback 76 in step 642 of FIG. 7). Then, FS-Aware data reduction layer(s) 50 receives, from the remote file server 60, supplemental metadata 74 that indicates that the remote file server 60 has assigned the particular file type to a determined data reduction policy (and inserts into the file type DB 82 as in step 575).

Then, after either step 575 or 585, in step 590, FS-Aware data reduction layer(s) 50 detects that the particular file type has become associated with the determined data reduction policy (e.g., by looking it up in the file type DB 82). Then, operation proceeds to step 530 but in the context of selectively applying data reduction to blocks 78 of a second set of blocks 78 having the particular file type according to the policy associated with that file type.

CONCLUSION

Thus, techniques have been presented for providing information about file 66 organization in a file server 60 to the block storage server 31 so that the information can be taken into account when writing data to persistent storage 32. To this end, communication associated with writes of data blocks 68 from the file server 60 to the block storage server 31 provides metadata 74 that describes placement of the data blocks 68 in a filesystem 64 on the file server 60. The block storage server 31 can then organize blocks 78 belonging to the same files 66 near one another in block storage 32, resulting in improved read performance.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, as used herein and unless a specific statement is made to the contrary, the word "subset," when used in connection with a "set," refers to a strict (or proper) subset of the set, meaning that the set includes at least one element not included within the subset.

Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "background," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method, performed by a block-storage server, of storing data, the method comprising:
   receiving, from a remote file server, data blocks to be written to persistent block storage managed by the block-storage server;
   receiving, from the remote file server, metadata describing a placement of the data blocks in a filesystem managed by the remote file server; and
   organizing the data blocks within the persistent block storage based, at least in part, on the received metadata;
   wherein the metadata for each data block indicates a file to which that data block belongs;
   wherein organizing the data blocks includes storing data blocks belonging to respective files in respective locations of the persistent block storage together with other data blocks belonging to the respective files; and
   wherein storing data blocks belonging to respective particular files in respective locations of the persistent block storage includes segregating a set of data blocks belonging to different files in respective stripes of the persistent storage, including arranging data blocks belonging to a first file in a first stripe of the persistent block storage and arranging data blocks belonging to a second file in a second stripe of the persistent block storage.

2. The method of claim 1 wherein storing data blocks belonging to respective particular files in respective locations of the persistent block storage includes:
   aggregating multiple data blocks belonging to a particular file into a data extent;
   compressing the data extent, yielding a compressed extent; and
   storing the compressed extent in the persistent block storage.

3. The method of claim 1 wherein arranging the data blocks belonging to the first file in the first stripe includes:
   aggregating multiple data blocks belonging to the first file into a data extent;
   compressing the data extent, yielding a compressed extent; and
   storing the compressed extent in the first stripe of the persistent block storage.

4. The method of claim 3 wherein arranging the data blocks belonging to the first file in the first stripe further includes, prior to aggregating the multiple data blocks belonging to the first file into the data extent, determining that the multiple data blocks belonging to the first file are to be compressed.

5. The method of claim 4 wherein storing data blocks belonging to respective particular files in respective locations of the persistent block storage further includes:
   determining that blocks belonging to a third file are not to be compressed; and
   storing a plurality of blocks belonging to the third file that are in the first stripe directly within the first stripe without aggregating or compressing the plurality of blocks belonging to the third file that are in the first stripe.

6. The method of claim 1 wherein the metadata includes file identifiers that identify files uniquely with respect to all filesystems managed by file servers that are configured to send data blocks to the block-storage server.

7. The method of claim 6 wherein receiving the metadata includes receiving a file identifier together with each of the data blocks.

8. The method of claim 6 wherein the metadata includes a single file identifier embedded within a write command received from the remote file server, the write command indicating a set of multiple data blocks from the remote file server that belong to a same file.

9. The method of claim 6 wherein each file identifier includes (i) a filesystem identifier that uniquely identifies a filesystem and (ii) an inode identifier that uniquely identifies a file within that filesystem.

10. The method of claim 1 wherein receiving the metadata includes:
    receiving a reference to a particular inode stored within the persistent block storage, the particular inode provided for a particular file managed by the remote file server; and
    identifying received data blocks that belong to the particular file based at least in part on traversing a block tree associated with the particular inode.

11. A computer program product comprising a non-transitory computer-readable storage medium storing instructions, which, when executed by a block-storage server, cause the block-storage server to:
    receive, from a remote file server, data blocks to be written to persistent block storage managed by the block-storage server;
    receive, from the remote file server, metadata describing a placement of the data blocks in a filesystem managed by the remote file server; and
    organize the data blocks within the persistent block storage based, at least in part, on the received metadata;
    wherein the metadata for each data block indicates a file to which that data block belongs;
    wherein organizing the data blocks includes storing data blocks belonging to respective files in respective locations of the persistent block storage together with other data blocks belonging to the respective files; and
    wherein storing data blocks belonging to respective particular files in respective locations of the persistent block storage includes segregating a set of data blocks belonging to different files in respective stripes of the persistent storage, including arranging data blocks belonging to a first file in a first stripe of the persistent block storage and arranging data blocks belonging to a second file in a second stripe of the persistent block storage.

12. The computer program product of claim 11,
    wherein the metadata includes file identifiers that identify files uniquely with respect to all filesystems managed by file servers that are configured to send data blocks to the block-storage server; and
    wherein each file identifier includes (i) a filesystem identifier that uniquely identifies a filesystem and (ii) an inode identifier that uniquely identifies a file within that filesystem.

13. The computer program product of claim 11,
wherein receiving the metadata includes:
  receiving a reference to a particular inode stored within the persistent block storage, the particular inode provided for a particular file managed by the remote file server; and
  identifying received data blocks that belong to the particular file based at least in part on traversing a block tree associated with the particular inode.

14. The computer program product of claim 11 wherein arranging the data blocks belonging to the first file in the first stripe includes:
  aggregating multiple data blocks belonging to the first file into a data extent;
  compressing the data extent, yielding a compressed extent; and
  storing the compressed extent in the first stripe of the persistent block storage.

15. The computer program product of claim 14 wherein arranging the data blocks belonging to the first file in the first stripe further includes, prior to aggregating the multiple data blocks belonging to the first file into the data extent, determining that the multiple data blocks belonging to the first file are to be compressed.

16. An apparatus comprising:
  persistent block storage managed by the apparatus; and
  a controller coupled to memory configured to:
    receive, from a remote file server, data blocks to be written to the persistent block storage;
    receive, from the remote file server, metadata describing a placement of the data blocks in a filesystem managed by the remote file server; and
    organize the data blocks within the persistent block storage based, at least in part, on the received metadata;
  wherein the metadata for each data block indicates a file to which that data block belongs;
  wherein organizing the data blocks includes storing data blocks belonging to respective files in respective locations of the persistent block storage together with other data blocks belonging to the respective files; and
  wherein storing data blocks belonging to respective particular files in respective locations of the persistent block storage includes segregating a set of data blocks belonging to different files in respective stripes of the persistent storage, including arranging data blocks belonging to a first file in a first stripe of the persistent block storage and arranging data blocks belonging to a second file in a second stripe of the persistent block storage.

17. The apparatus of claim 16,
  wherein the metadata includes file identifiers that identify files uniquely with respect to all filesystems managed by file servers that are configured to send data blocks to the block-storage server; and
  wherein each file identifier includes (i) a filesystem identifier that uniquely identifies a filesystem and (ii) an inode identifier that uniquely identifies a file within that filesystem.

18. The apparatus of claim 16,
wherein receiving the metadata includes:
  receiving a reference to a particular inode stored within the persistent block storage, the particular inode provided for a particular file managed by the remote file server; and
  identifying received data blocks that belong to the particular file based at least in part on traversing a block tree associated with the particular inode.

19. The apparatus of claim 16 wherein arranging the data blocks belonging to the first file in the first stripe includes:
  aggregating multiple data blocks belonging to the first file into a data extent;
  compressing the data extent, yielding a compressed extent; and
  storing the compressed extent in the first stripe of the persistent block storage.

20. The apparatus of claim 19 wherein arranging the data blocks belonging to the first file in the first stripe further includes, prior to aggregating the multiple data blocks belonging to the first file into the data extent, determining that the multiple data blocks belonging to the first file are to be compressed.

* * * * *